(12) United States Patent
Rahman

(10) Patent No.: US 7,110,627 B2
(45) Date of Patent: Sep. 19, 2006

(54) REFLECTIVE ARRAYED WAVEGUIDE GRATING

(75) Inventor: Anis Rahman, Hummelstown, PA (US)

(73) Assignee: Applied Research & Photonics, Inc., Hummelstown, PA (US)

( * ) Notice: Subject to any disclaimer, the term of this patent is extended or adjusted under 35 U.S.C. 154(b) by 145 days.

(21) Appl. No.: 10/605,638

(22) Filed: Oct. 15, 2003

(65) Prior Publication Data

US 2004/0105610 A1 Jun. 3, 2004

Related U.S. Application Data

(60) Provisional application No. 60/420,763, filed on Oct. 24, 2002.

(51) Int. Cl.
*G02B 6/12* (2006.01)
*G02B 6/26* (2006.01)
*G02B 6/34* (2006.01)

(52) U.S. Cl. .............................. 385/14; 385/18; 385/37

(58) Field of Classification Search .................. 385/14, 385/15, 17, 18, 31, 37
See application file for complete search history.

(56) References Cited

U.S. PATENT DOCUMENTS

| 4,973,429 A | 11/1990 | Decher et al. |
| 5,208,111 A | 5/1993 | Decher et al. |
| 5,396,507 A | 3/1995 | Kaminow et al. |
| 5,546,483 A * | 8/1996 | Inoue et al. ................... 385/14 |
| 6,051,372 A | 4/2000 | Bayerl et al. |
| 6,122,419 A * | 9/2000 | Kurokawa et al. ............ 385/31 |
| 6,188,818 B1 | 2/2001 | Han et al. |
| 6,278,813 B1 * | 8/2001 | Takada et al. ................ 385/24 |
| 6,456,760 B1 * | 9/2002 | Kurokawa et al. ............ 385/31 |
| 6,720,093 B1 | 4/2004 | Samuel et al. |
| 6,769,274 B1 | 8/2004 | Cho et al. |
| 6,859,574 B1 | 2/2005 | Doerr et al. |
| 6,892,003 B1 * | 5/2005 | Katayama et al. ............ 385/39 |
| 2001/0033715 A1 | 10/2001 | Delisle et al. |
| 2004/0105610 A1 | 6/2004 | Rahman |
| 2004/0208417 A1 * | 10/2004 | Purchase et al. .............. 385/14 |
| 2005/0135778 A1 * | 6/2005 | Dominic et al. ............ 385/147 |

OTHER PUBLICATIONS

K. Okamoto; "Fundamentals of Optical Waveguides, Ch. 9"; Academic Press, New York 2000.
K.M.A. Rahman, C.J. Durning, N.J. Turro and D.A. Tomalia; "Adsorption of Poly(amido amine) Dendrimers on Gold"; Langmuir2000, vol. 16; pp. 10154-10160.

(Continued)

*Primary Examiner*—Kaveh Kianni
(74) *Attorney, Agent, or Firm*—McNees Wallace & Nurick LLC

(57) ABSTRACT

This invention discloses a "reflective arrayed waveguide grating," (RAWG) for demultiplexing a multiplexed optical signal into its component wavelengths and for multiplexing n optical signals into a multiplexed signal. The present invention found that a single slab can be used for coupling the signal in and for focusing the signal out of the array of waveguide that functions as a grating; and a single external fiber array interface containing plurality of fibers can be used for both inputting the signal in and for outputting the signal from the RAWG. Advantageously, this method reduces the chip size and on-chip insertion loss by eliminating a slab and using 50% shorter waveguides in the array allowing significant savings of the silicon real estate. The smaller chip size increases the reliability of the device significantly and almost doubles the yield of chips per wafer. Additionally, used as a building block, these chips can enable further functionality enhancement via tiers of monolithic triple-phase integration.

3 Claims, 15 Drawing Sheets

OTHER PUBLICATIONS

K.M. Anis Rahman, Christopher J. Durning and Nicholas J. Turro; "Molecular Dynamics of PAMAM Dendrimers"; http://dwdm2.home.comcast.net/p-amamdynamics.pdf.

Dendritic Nano Technologies website at http://dnanotech.com/properties.html.

Akira Otomo, Sonoko Otomo, Shiyoshi Yokoyama, Tatuso Nakahama, Shinro Mashiko; "Remarkable optical properties of dendrimers for laser applications"; Linear and Nonlinear Optics of Organic Materials; Manfred Eich and Mark G. Kuzyk—Editors; Proceedings of SPIE; vol. 4461; pp. 180-187; 2001.

Alex K. Y. Jen, Hong Ma, Takafumi Sassa, Sen. Liu, S. Suresh, Larry R. Dalton, and Marnie Haller; "Highly efficient and thermally stabler organic/polymeric electro-optic materials by dendritic approach"; Linear and Nonlinear Optics of Organic Materials; Manfred Eich and Mark G. Kuzyk—Editors; Proceedings of SPIE; vol. 4461, pp. 172-179; 2001.

Pr. Gero Decher; "L'Interfacage Macromoleculaire: Nouveaux Materiaux par Nanoassemblage"; Conference du Mercredi; 12 Fevrier 2003.

Claire Pitois, Robert Vestberg, Marlene Rodlert, Eva Malmstrom, Anders Hult, Mikael Lindgren; "Flourinated dendritic polymers and dendrimers for waveguide applications"; Optical Materials; vol. 21, pp. 499-506; 2002.

Larry R. Dalton; "Polymeric and Dendritic Electro-Optic Materials: Materials Issue"; University of Washington; Seattle, Washington 98185-01700.

C. Dragone; "An NxN Optical Multiplexer Using a Planar Arrangement of Two Star Couplers"; IEEE Photonics Technology Letters; vol. 3, No. 9; pp. 812-815; Sep. 1991.

Y. Inoue, A. Himenko, K. Moriwaki, M. Kawachi; "Silica-based arrayed-waveguide grating circuit as optical splitter/router"; Electronics Letters; vol. 31; No. 9; pp. 726-727; Apr. 27, 1995.

H. Bissessur, B. Martin, R. Mestric, and F. Gaborit; "Small-size, polarization-independent phased-array demultiplexers on InP"; Electronics Letters; vol. 31; No. 24; pp. 2118-2120; Nov. 23, 1995.

T. Brenner, C.H. Joyner and M. Zirngibl; "Compact design waveguide grating routers"; Electronics Letters; vol. 32; No. 18; pp. 1660-1661; Aug. 29, 1996.

M. Zirngibl, C.H. Joyner and J.C. Centanni; "Size reduction of waveguide grating router through folding back the input/output fanouts"; Electronics Letters, vol. 33; No. 4; pp. 295-297; Feb. 13, 1997.

Hideaki Okayama, Masato Kawahara and Takeshi Kamijoh; "Reflective Waveguide Array Demultiplexer in $LiNbO_3$"; Journal of Lighwave Technology; vol. 14; No. 6; pp. 985-990; Jun. 1996.

* cited by examiner

REFLECTIVE ARRAYED WAVEGUIDE GRATING

BACKGROUND OF INVENTION

1. Field of Invention

This invention relates to a photonic integrated circuit, specifically to a reflective arrayed waveguide grating, that is used for wavelength division multiplexing and demultiplexing for fiberoptic communication networks. It also relates to several other passive and active photonic device applications in the capacity of a building block via triple-phase integration described herein.

2. Description of the Prior Art

Recently arrayed waveguide gratings (AWGs) have proven to be an attractive vehicle for achieving high channel count wavelength division multiplexing (WDM) (see for example "An N×N optical multiplexer using a planar arrangement of two star couplers" disclosed by C. Dragone in IEEE Photonic Technology Letters, vol. 3, no. 9, 1991, pp 812815, or U.S. Pat. No. 0,033,715 A1 titled "Arrayed waveguide grating having a reflective input coupling," Delisle, et al., Oct. 25, 2001). The basic strength and cost competitive success of this technology stems from the fact that it is built upon the strength of matured semiconductor fabrication (fab) technology. Many basic and precision fab facilities and advantages can be utilized in fabricating photonic integrated circuits (PICs) on silicon wafer or on other suitable wafers. The photonic components built on the surface of a wafer are generally known as the planar components; examples include planar waveguide, AWGs, interleavers, star couplers, variable optical attenuators (VOAs) and other integrated solutions that can be built around PIC chips. The planar star coupler, in fact, is the mother device for AWGs, because, in an AWG, two modified planar couplers are connected via an array of planar waveguides having a fixed path difference between successive ones, thereby acting as a grating. An analogy to the electronic ICs may be used to elucidate the photonic waveguides and PICs: PICs are the counterparts of the electronic ICs where photonic waveguides are the basic building blocks similar to the transistors for the ICs. Like transistors can perform switching, amplifying, and signal processing functions of electronic signal, photonic waveguides and photonic integrated circuits can be designed to perform similar functions with light signals.

Detailed construction of a regular AWG is illustrated in FIG. 1, which for the ease of comparison, will be termed as a transmissive arrayed waveguide grating (TAWG) because it functions by transmitting light from the input through the device to the output. A TAWG is commonly used as a multiplexer (MUX) and/or a demultiplexer (DMUX). As shown in FIG. 1, a TAWG is built on a substrate 10 on which waveguides and slabs are fabricated whose functionalities are described in the following. A TAWG has the following main functional parts: a single or plurality of input waveguides 3, an input slab 4, an array of waveguides containing plurality of neighboring waveguides 5, an output slab 6, and a plurality of output waveguides 7 whose number typically equals to the number of channels of the device.

Referring to FIG. 1, the functionality of a TAWG can be briefly explained as follows. The input waveguide 3 carries a multiplexed signal to the input slab 4 that couples the signal to the array of waveguides 5. The waveguides in the array are fabricated with a constant path difference, ΔL, between the neighbors. These waveguides lead the multiplexed signal to the output slab 6. Because of the path difference between successive waveguides, the light undergoes interference; the intensity of constructive interference is focused at well-defined positions at the other end of the output slab 6A. Here, output waveguides 7 are fabricated at calculated positions to collect the signals that are already separated into constituent wavelengths by the interference mechanism, thus completing the demultiplexing function. The multiplexing is achieved by following a reverse path: since the AWG works as a spectrograph device, when individual wavelengths (signals) are launched into the waveguides 7 attached to the output slab 6, they will form a combined or "multiplexed" signal at the end of the input slab 4. Thus a TAWG (e.g., the one shown in FIG. 1) functions by means of transmitting light from the input terminal via the input waveguide through the entire device.

The structure as a whole 11 referred to as an optical chip or a photonic integrated circuit (PIC), because it is constructed by assembling the waveguide elements in an integrated fashion. While in the current practice of PICs it is not implemented yet, this inventor envisions that a PIC may also contain additional elements such as modulator, amplifier and detector on the same substrate, thus qualifying the PIC as a platform for designing many passive and active photonic devices via triple-phase integration, as described in the preferred embodiments.

The TAWG described above suffers from several disadvantages such as bigger area per device, longer waveguide lengths in the array, and two different slabs for input and output, all of which contribute to a higher insertion loss. Two different fiber-array interfaces are required for packaging; one for input and one for output. Having two different external interfaces is also disadvantageous, because, attaching two different fiber arrays increases the packaging loss, makes it relatively less reliable, and increases chance of failure.

AWG Size Reduction

A compact design of AWGs has been the subject matter of many contemporary investigations. Here we review available designs as published in the literature with a view to contrast the present invention with the previous attempts.

A design titled "Silica-based arrayed waveguide grating circuits as optical splitter/router," published in Electronics Letters, vol. 31, No. 9, 1995, pp 726–727, by Y. Inoue, A. Himeno, K. Moriwaki and M. Kawachi, proposed a reflection type arrayed waveguide grating circuit for optical power splitting and wavelength routing functions. The authors reported 1×14 optical power splitter with a mean insertion loss of 15.5 dB and the wavelength router's insertion loss ranged from 5.2 dB to 8.5 dB (a channel non-uniformity of 3.3 dB) with an inter-channel crosstalk of 19 dB.

Polarization insensitive, InP based DMUX was demonstrated for a 1×16 device [see "Small-size, polarization independent phased-array demultiplexers on InP," by H. Bissessur, B. Martin, R. Mestric and F. Gaborit, published in Electronics Letters, vol. 31, No. 24, 1995, pp 2118–2120] that exhibited an insertion loss of 8 dB and the crosstalk was 14 dB.

A design for two-slab waveguide grating routers via InP/InGaAsP material that would reduce the chip size was reported (see "Compact design waveguide grating routers," by T. Brenner, C. H. Joyner, and M. Zirngibl, published in Electronics Letters, vol. 32, no. 18, 1996, pp 1660–1661). This design is based on a pair of interlaced conventional waveguide grating routers that share the slab area by means of a cleavage through the centers of the shared slabs (or free space region, in their nomenclature). The reported on-chip transmission loss was 7.5 dB for the central channel and 1 dB higher for the outermost ports of the 8-channel device. The reported crosstalk was on the order of 20 dB.

InP based waveguide grating router's size reduction by folding back the input/output ports and exploiting mirror reflections off of multiple facets created by cleaves was reported (see "Size reduction of waveguide grating router through folding back the input/output fanouts," by M. Zirngibl, C. H. Joyner, and J. C. Centanni, published in Electronics Letters, vol. 33, No. 4, 1997, pp 295–297). They reported an insertion loss of 4 dB for the best channel measured against a straight test waveguide and 2–3 dB more for triple cleaved router. No crosstalk number was reported.

A reflective waveguide array demultiplexer using electro-optic $LiNbO_3$ was proposed (see "Reflective waveguide array demultiplexer in $LiNbO_3$," by H. Okayama, M. Kawahara, and T. Kamijoh, in Journal of Lightwave Technology, vol. 14, No. 6, 1996, pp 985–990). For a 1×4 device, the authors have reported an insertion loss of 15 dB and crosstalk ranging from 12 to 25 dB.

It is clear from the above review that previous attempts of the chip's size reduction of several photonic integrated circuits have enjoyed a partial success. In all cases, however, size reduction is accompanied by a higher loss and lower performance. The present invention addresses the chip size reduction with simultaneous improvement of the device performance, and outlines methods of using the RAWG as a building block to fabricate additional devices via triple-phase integration.

SUMMARY OF INVENTION

This invention discloses a "reflective arrayed waveguide grating," (RAWG) for optical multiplexing and demultiplexing applications that uses a single slab for both input and output. It also uses shorter length of the waveguides in the array, thereby reducing the chip size to half compared to a TAWG. By eliminating one of the slabs, the design allows for a single external fiber array interface to the chip. These factors reduce the chip size and on-chip losses significantly. Moreover, the waveguide lengths are also half compared to what is necessary for a TAWG, thus contributing to lower insertion loss and significant savings of the silicon real estate. The smaller chip size increases the reliability of the device significantly and almost doubles the yield of chips per wafer. Used as a "building block," these chips enable fabrication of several passive and active modules in an integrated platform.

Also disclosed is a photonic intergrated circuit (PIC) for demultiplexing optical signal in to its constituent wavelengths and for combining n input optical signal composed of n different wavelengths in to a multiplexed signal. The said PIC is comprised of a plurality of input/output wavelenghts for inputting signal to and outputting signal from the PIC. A slab wavelength is provide for coupling the input signal to the array of waveguides and for focusing the demultiplexed signals to the output waveguides. An array waveguide contains a plurality of the waveguides which are optically coupled on the slab plane at one end and terminated by a reflective mirror on the other end. Each of the waveguides in the array waveguide have a flexed path difference from the neighboring waveguide, for coupling the input signal and separating the input constituent wavelength. The individual constituent wavelength of the input signal are then focused by the array wavelength back on to the slab-input/output waveguide interface. The reflective mirror terminates the plurality of waveguides of the array waveguide for reflecting the signals incident on it from the array waveguide back into the array waveguide. The input/output waveguide, the slab, and the array of waveguides are fabricated on a substrate using a layer by layer approach. The assembly forms a photonic integrated circuit or an optical chip, termed as a reflective array waveguide grating (RAWG).

Any one of the waveguides can be used as the input channel while the remainder wavegides will function as the output channels allowing a built-in vernier effect because any of the waveguides can be used to launch the input signal while the rest will automaticlly be the outputs. Yet another advantage of the RAWG is that it provides a choice of output wavelengths by choosing an appropriate input waveguide, whereas previously, for a fixed input channel, the output wavelengths are always fixed.

A plurality of channel numbers for the RAWG can be varied as 4, 8, 12, 16, 24, 32, and 48. Additionally,the channel spacing can be varied to comply with ITU-T definition such as 0.25 nm (~31 GHz), 0.4 nm (50 GHz), 0.8 nm (100 GHz), 1.6 nm (200 GHz), 4 nm (500 GHz), and 5 nm (624 GHz). Finally, the channel frequencies can be designed to match the ITU grid frequencies.

In another aspect of the present invention is disclosed integrating via monolithic integration of a photonic intergrated circuit (PIC) over the tiers, termed triple-phase integration, wherein a RAWG such as the one disclosed is used as a building block for further functionality enhancement. A second-phase integration of the said RAWG produces passive devices with amplification. A third-phase integration of the said RAWG may also be included, which produces active devices with amplification.

The second-phase integration of the photonic integrated circuit (PIC) comprises a RAWG for demultiplexing a multiplexed optical signal in to its constituent wavelengths and for combining n input optical signals composed of n different wavelenghts in to a multiplexed signal, and for amplifying the said multiplexed and demultiplexed signals. The said PIC is comprised of a RAWG and a waveguide amplifier block connected via waveguide interconnect disposed on a substrate. The RAWG, the amplifier block, and the waveguide interconnects are fabricated by a monolithic means such as a layer by layer approach. The assembly forms a second-phase photonic intergrated circuit, termed as an amplified PIC (APIC).

The third-phase integration of the photonic intergrated circuit (PIC) comprises a RAWG for demultiplexing a multiplexed optical signal in to its constituent wavelengths and for combining n input optical signals composed of n different wavelengths in to a multiplexed signal, for modulation of the said optical signal, and for amplifying the said optical signal. The said is comprised of a modulator block composed of waveguides and electrodes, a RAWG, a waveguide amplifier block. The modulator, the RAWG and the amplifier block are connected via waveguide interconnect and disposed on a substrate. The modulator block, the RAWG, the amplifier block, and the waveguide interconnects are also fabricated by a monolithic means such as a layer by layer approach. The assembly forms a third-phase photonic intergrated circuit, termed an amplified electro-optic PIC (AEPIC).

One advantage of the present invention is that the single slab waveguide function as both input and output slab wherein a single external interface functions as both input and output allowing significant packaging reliability enhancement of the device.

another advantage of the present invention is that the design architecture of RAWG reduces the chip size to approximately 50% of that required for a TAWG of identical channel number, and the on-chip loss is reduced significantly compared to a TAWG of same number of channels and made from the same material.

A further advantage of the present invention is that the reduced chip size almost doubles the RAWG yield per wafer compared to a TAWG having the same number of channels as RAWG. The higher yield in turn lowers the production cost of the devices while it simultaneously enhances performance.

Another advantage is that a smaller chip size results in a more compact package size.

Yet another advantage of the present invention is that the design allows significant lower on-chip loss.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment

PREFERRED EMBODIMENT

The current invention describes a solution to the size reduction problem with a goal to reduce the chip size with simultaneous improvement of performance in terms of reduced loss and external interface. The most compelling rationale for size reduction are: (i) yield per wafer will increase as the size per chip is reduced; this in turn will cut the cost of the devices, (ii) smaller chip size will result in smaller package size, and (iii) it is easier to maintain temperature uniformity of a smaller chip and smaller package which is crucial for reliable device operation.

In addition to the size reduction, other objectives of the present invention are to reduce the on-chip loss and also to reduce the external interfaces to improve the reliability of the devices built around this chip. The device disclosed herein accomplishes all three objectives. A further objective is to use these chips as a building block for triple-phase integration.

DETAILED DESCRIPTION OF PREFERRED EMBODIMENT

Figure 1:
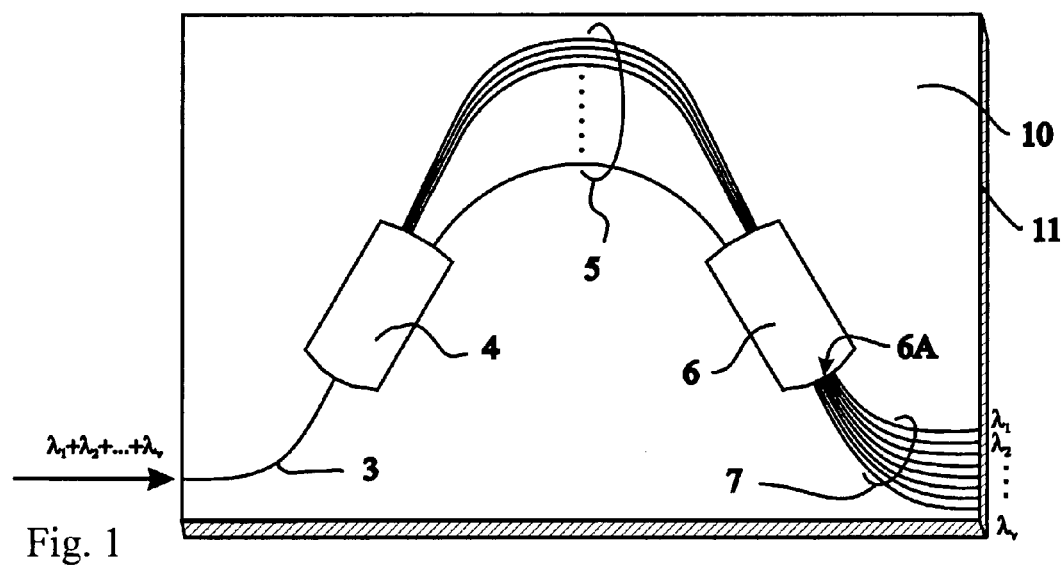
FIG. 1 shows a two-slab transmissive arrayed waveguide grating (TAWG) (prior art) and its constituent parts.
Figure 2A:
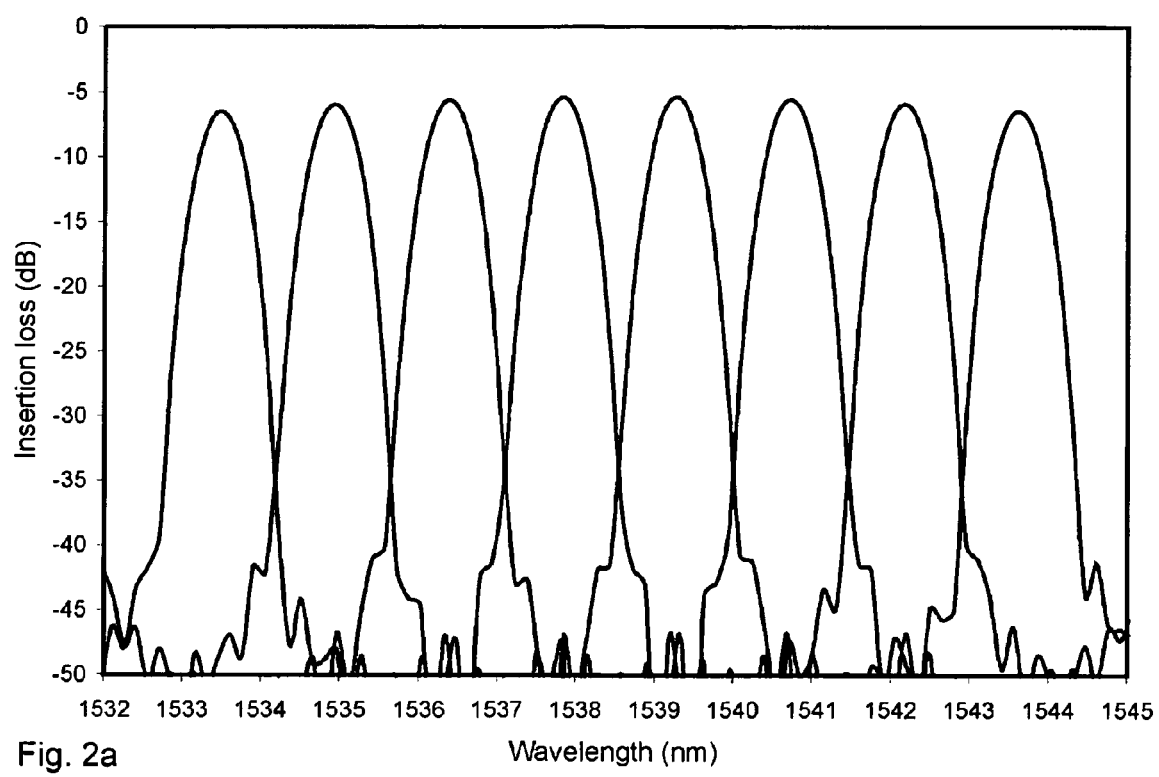
FIG. 2a shows the spectral response of the device shown in FIG. 1, and 2b shows a plot of the insertion loss of all channels.
Figure 2B:
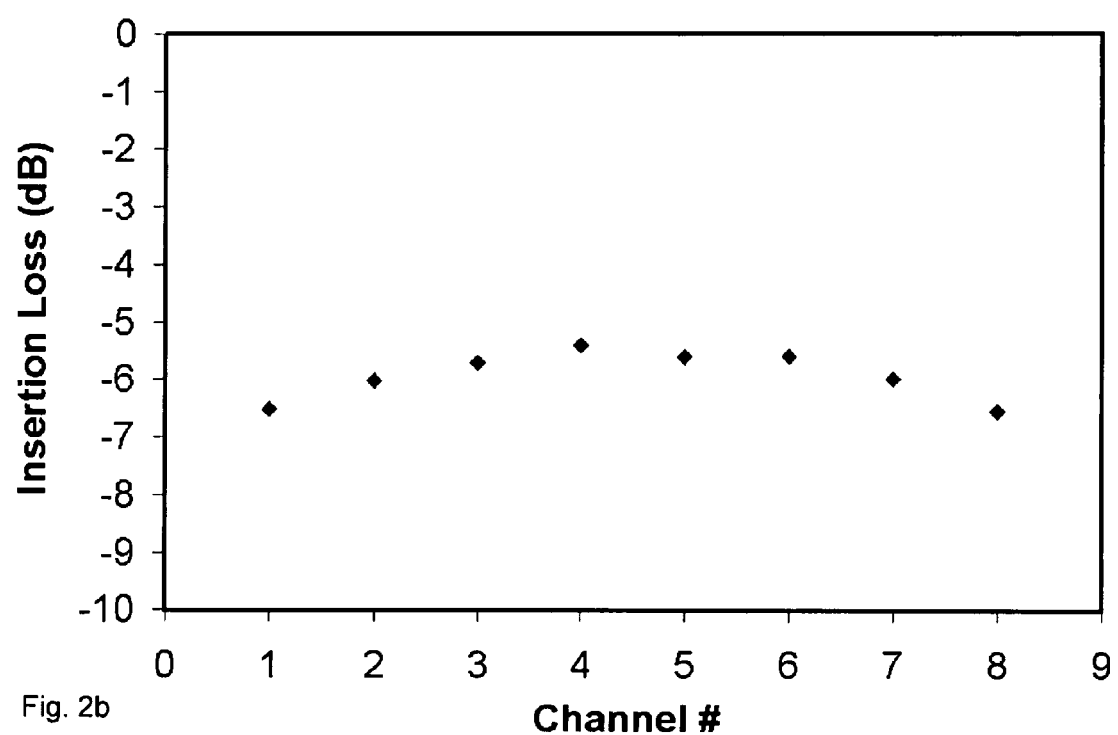
Figure 3:
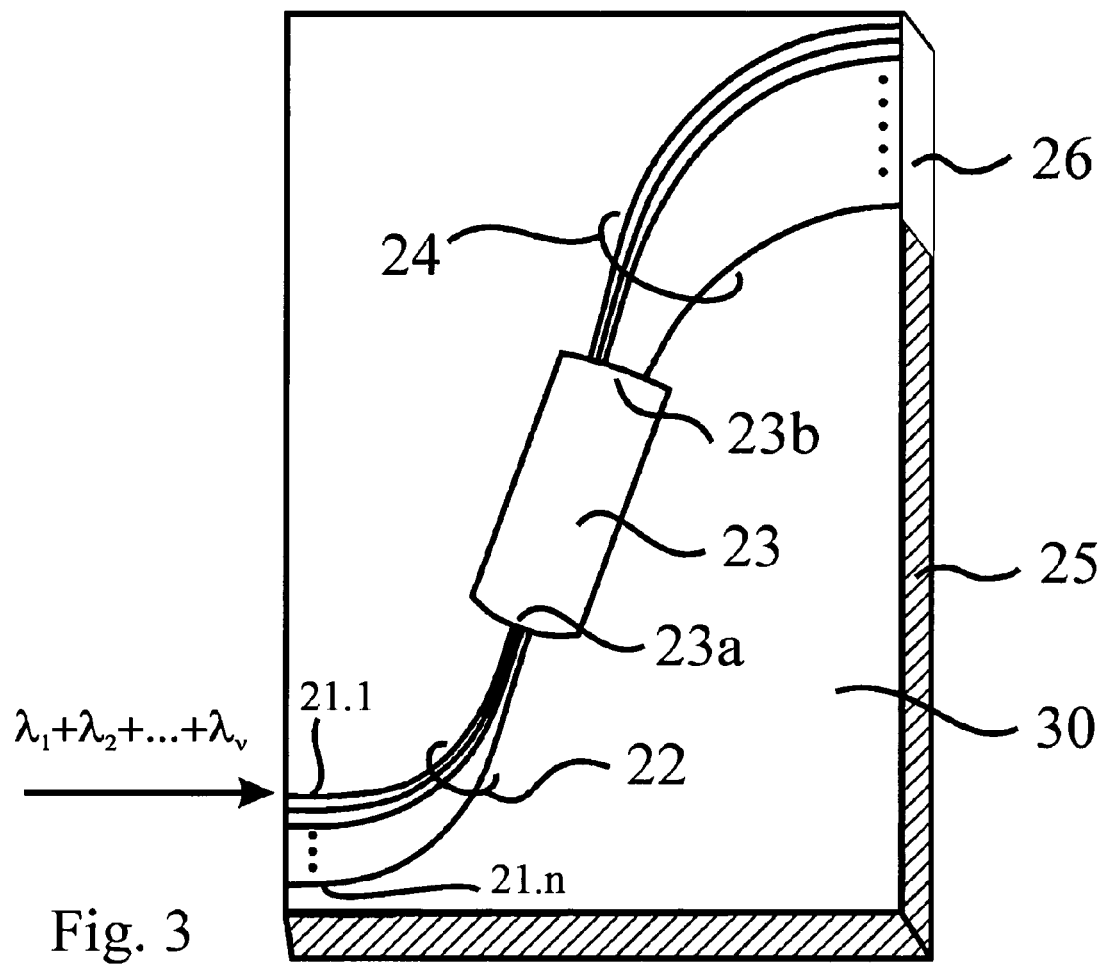
FIG. 3 shows the construction of a reflective arrayed waveguide grating (preferred art) along with its constituent parts.

The preferred art is described by the illustrations in FIG. 3 through FIG. 6. FIG. 3 is a schematic view showing a first embodiment of the "reflective arrayed waveguide grating" (RAWG). Referring to FIG. 3, the preferred art is composed of a plurality of waveguides 22, a slab 23, an array of waveguides 24, and a reflective surface or mirror 26 (FIG. 4); all of which is fabricated on a substrate 30. The whole assembly is referred to as a photonic integrated circuit (PIC) or alternatively an optical chip 25.

There are n waveguides, numbered 21.1 ... 21.n, connected to the input end 23a of the slab 23. These waveguides can serve as both input and output; as such any of these waveguides can be used to launch an input signal into the device. For illustration purposes, FIG. 3 shows that a multiplexed input signal composed of n-wavelengths is launched into the waveguide 21.1. The remaining waveguides, 21.2 ... 21.n serve as output channels for the demultiplexing function of the device. Similarly, the input signal can be launched into any of the waveguides while all other waveguides (except the input) will automatically function as output waveguides. For multiplexing functions, n-1 wavelengths can be launched into consecutive n-1 waveguides such as 21.2 ... 21.n. These signals will then combine together and be focused into waveguide 21.1, thereby completing multiplexing function.

An input multiplexed signal composed of a plurality of wavelengths, $\lambda_1+\lambda_2+ \ldots +\lambda_n$ launched into an input waveguide, say 21.1, will travel through the input waveguide and then shine into the slab 23a in the form of a cone whose spread will cover all waveguides in the array 24 meeting the other end of the slab 23b thereby the signal will get coupled to the array of waveguides 24. The multiplexed signal will travel through the waveguides and then be reflected back by the mirror 26 that terminates the waveguides. This reflected signal undergoes a total roundtrip path difference of $\Delta L$ between successive waveguides. Because of this path difference, light of different wavelength undergoes constructive and destructive interference, thereby separating the multiplexed signal into constituent wavelengths. The intensity of constructive interference is composed of demultiplexed wavelengths that are focused on the waveguides 21.2 ... 21.n at the slab interface. Thus, waveguides 21.2 ... 21.n serve as the output channels, completing the demultiplexing function.

Multiplexing is accomplished by following a reverse path. Individual wavelengths launched in n-1 waveguides, e.g., 21.2 ... 21.n will travel through the slab and the array of waveguides, then will be reflected back at the mirror 26 and the combined wavelengths will be focused at the position where waveguide 21.1 will carry the signal to output fiber.

Figure 5:
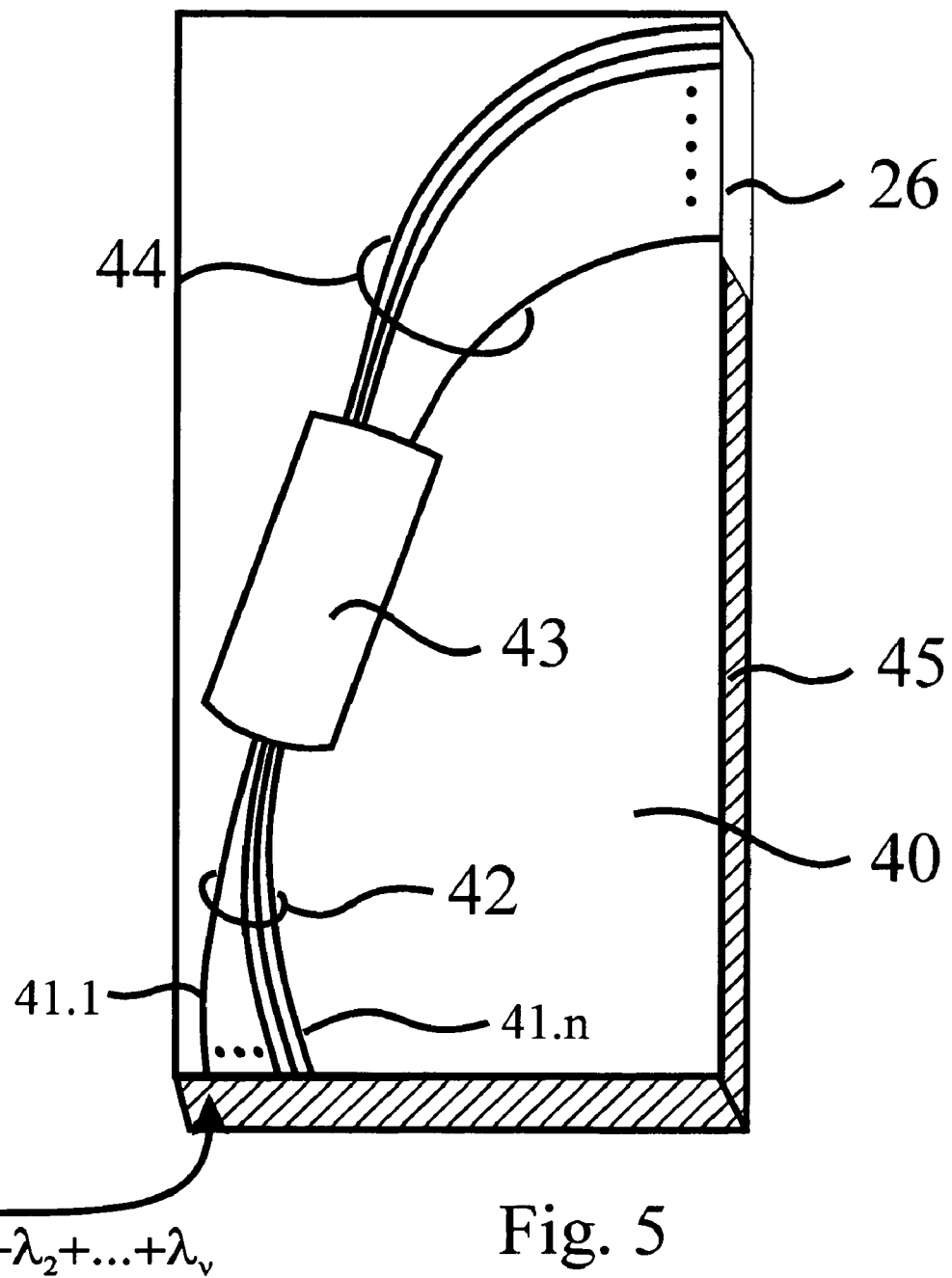
FIG. 5 is an alternative embodiment of the preferred art.

FIG. 5 shows an alternate preferred embodiment of the reflective arrayed waveguide grating. Here waveguides 41.1 . . . 41.n serve identical functions as 21.1 . . . 21.n described above in reference to FIG. 3, except their construction is such that it helps further reduction of the chip size. Similarly, items 42, 43, and 44 perform identical functions as items 22, 23, and 24, as described in the foregoing paragraphs in reference to FIG. 3.

The fabrication specifics of the waveguides are described in the next section. Following the principle described above, RAWGs can be designed for any number of channels such as 4, 8, 12, 16, 24, 32, 48, etc. Here we have given examples of an eight channel, a sixteen channel and a forty-eight channel device. The example of 48-channel device is described in terms of a TAWG here; however, it can be constructed as a RAWG as well.

Additionally channel spacing of a given RAWG can be designed to comply with ITU-T definitions such as 0.25 nm (~31 GHz), 0.4 nm (50 GHz), 0.8 nm (100 GHz), 1.6 nm (200 GHz), 4 nm (500 GHz), and so on, and individual channel frequencies can be designed to match the ITU grid frequencies.

Figure 6:
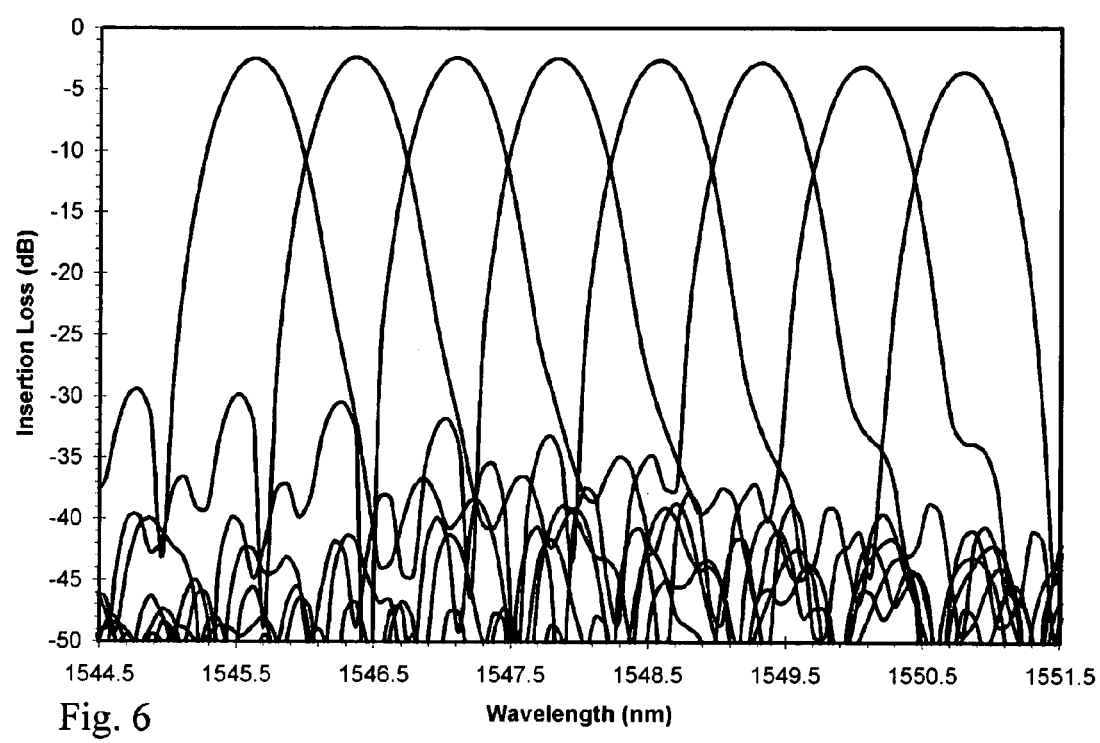
FIG. 6 shows the spectral response of an eight-channel RAWG.
Figure 7:
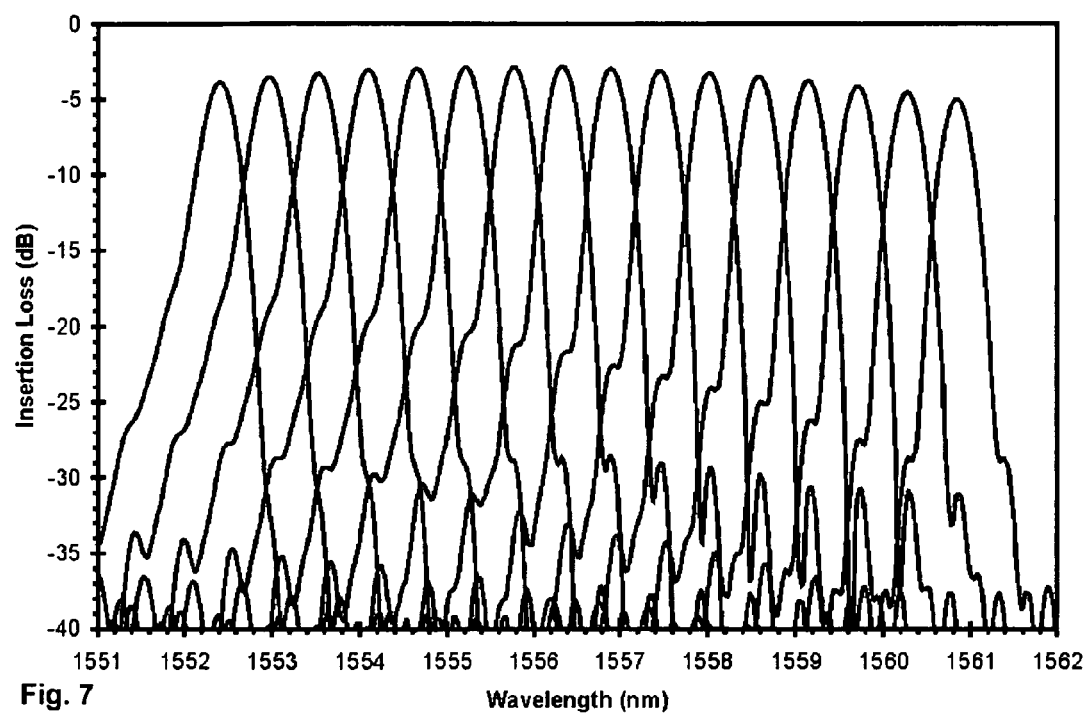
FIG. 7 shows the spectral response of a 16-channel RAWG.
Figure 8:
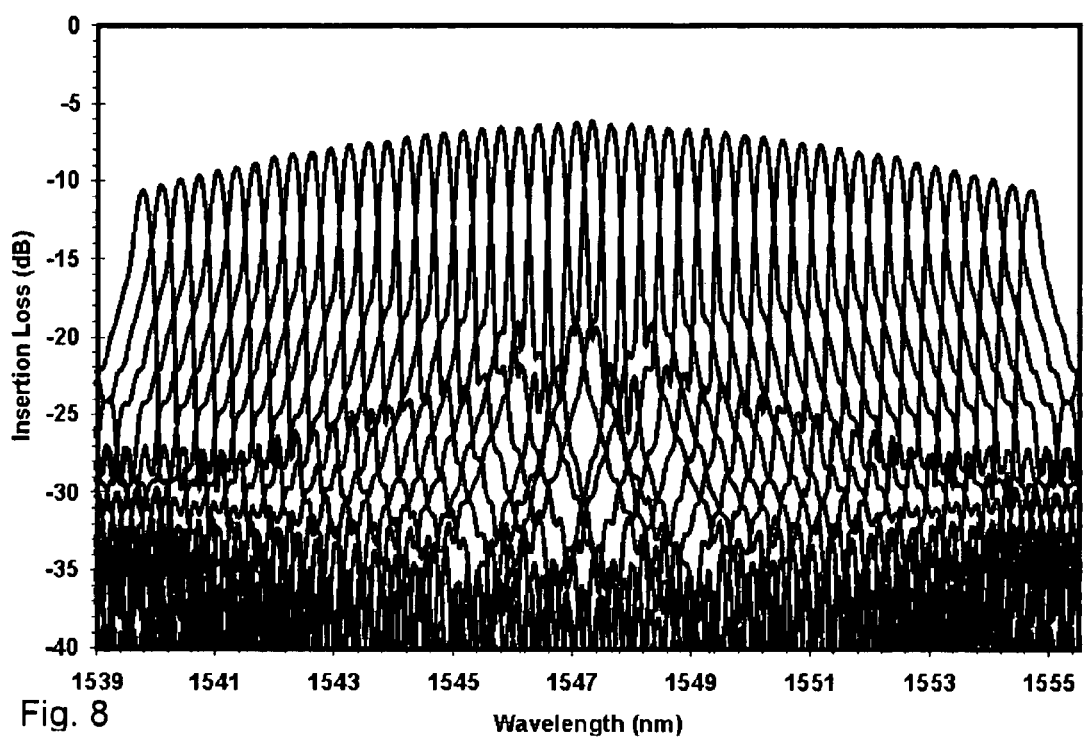
FIG. 8 exhibits the spectral response of a 48-channel TAWG.
Figure 9:
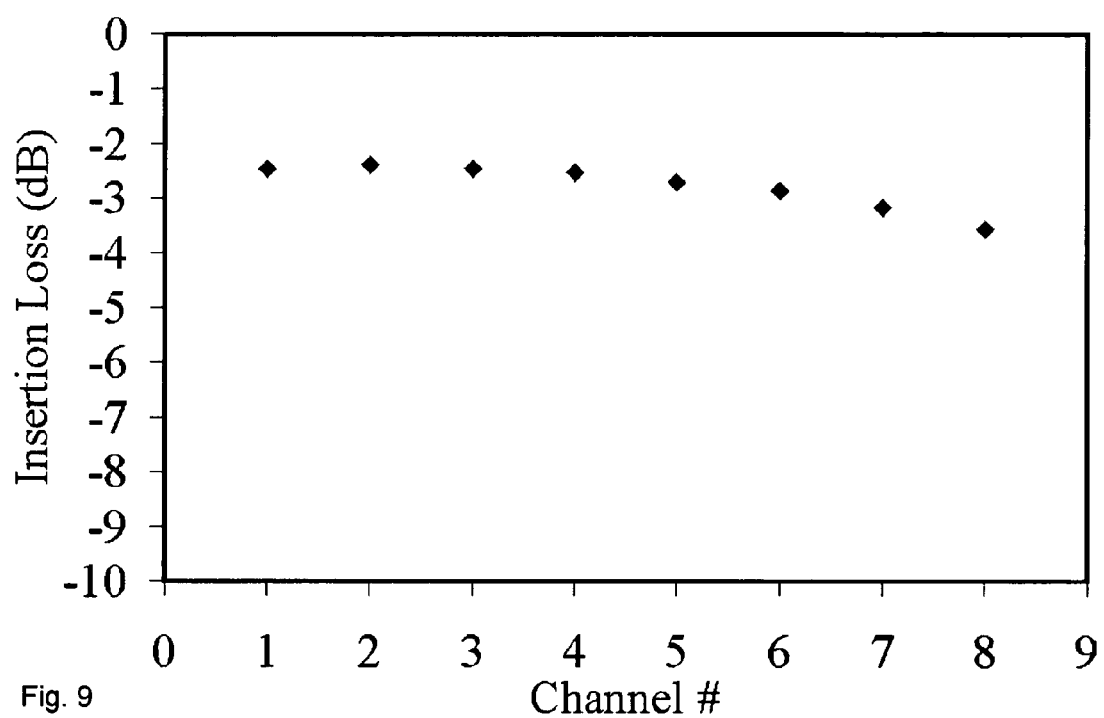
FIG. 9 shows the insertion loss of the RAWG as extracted from FIG. 6.
Figure 10:
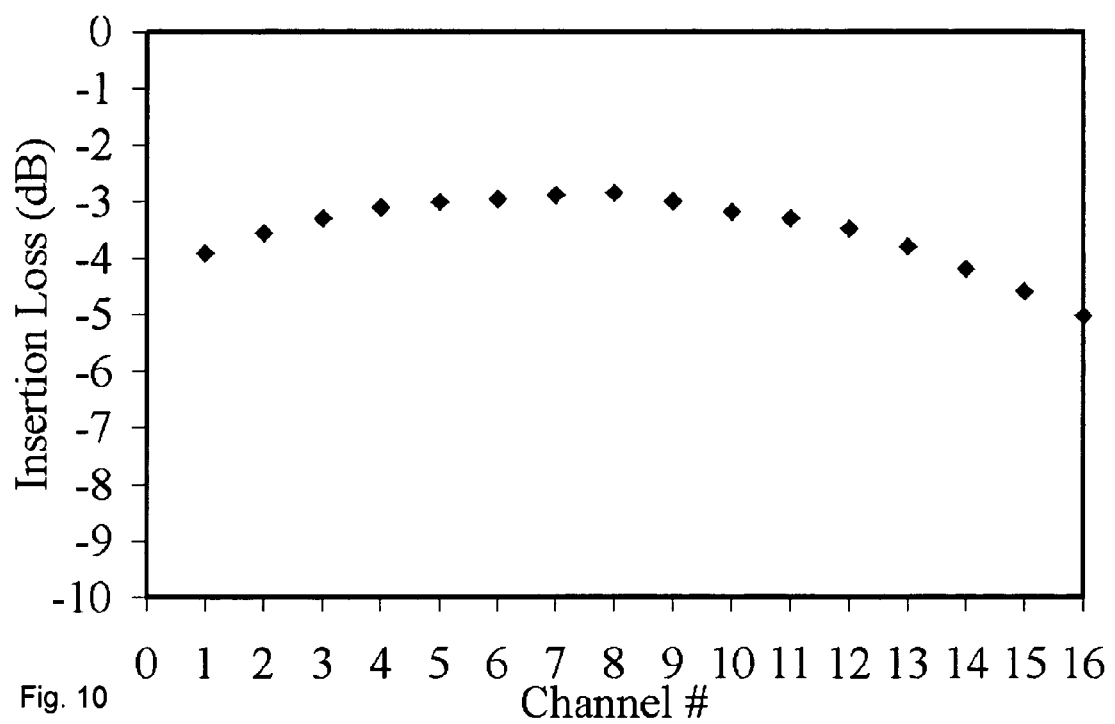
FIG. 10 shows the insertion loss of a 16 channel RAWG as extracted from FIG. 7.
Figure 11:
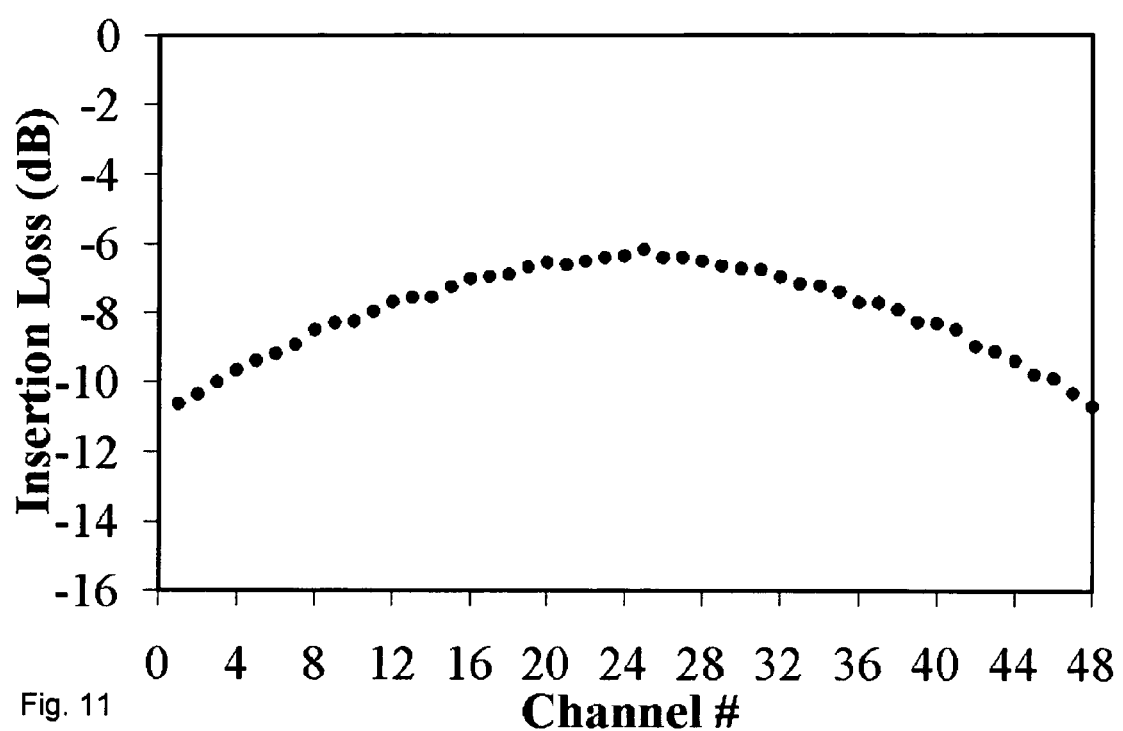
FIG. 11 shows the insertion loss of a 48 channel TAWG as extracted from FIG. 8.

FIG. 6 shows the spectral response of a RAWG that was constructed as an 8-channel device. FIG. 7 shows the spectral response of a RAWG designed for 16-channel and FIG. 8 shows the spectral response of a 48-channel TAWG. The design parameters for these devices are listed in Table 1. FIG. 9 shows the insertion loss of all channels of the 8-channel RAWG corresponding to the spectra in FIG. 6. The insertion loss of a 16-channel RAWG is shown in FIG. 10 (extracted from the spectral response of FIG. 7) and the insertion loss of a 48-channel TAWG are shown in FIG. 11 as extracted from the spectral response of FIG. 8.

TABLE

Critical design parameters for the RAWGs and the TAWGs whose spectra are shown in FIGS. 2a, 6, 7, and 8.

| Parameter (Unit) | 8-channel RAWG | 16-channel RAWG | 48-channel TAWG | 8-channel TAWG |
|---|---|---|---|---|
| Number of I/O waveguides | 9 | 17 | 1 input 48 output | 1 input 8 output |
| Slab length (µm) | 3700 | 6900 | 19300 | 4100 |
| Slab width (µm) | 1850 | 3450 | 9650 | 2050 |
| Waveguide width (µm) | 6 | 6 | 6 | 6 |
| Number of waveguide in the array | 37 | 69 | 193 | 41 |
| Path difference, ΔL (µm) | 150 | 128 | 128 | 128 |
| Center channel loss insertion (dB) | 2.53 | 2.84 | 6.18 | 5.40 |

Construction of the Waveguides and Fabrication of the Chip

Optical waveguides are conveniently constructed on a suitable substrate such as a silicon wafer by fabricating the core and the cladding in separate steps. An example is exhibited in FIG. 12 which shows a cross-sectional view of a waveguide construction.

A silicon (Si) wafer 100 is used as a substrate on which a layer of film 101 can be formed via a method that is common knowledge to people expert in this art, such as, spin-coating. The Si substrate has a refractive index in the range 3.4 and 3.5 and the first layer 101 can be formed from a material such as silica or a polymer (e.g., dendrimer) having a typical refractive index in the range 1.45 and 1.47. This layer 101 with a typical thickness 5–6 µm becomes part of the cladding. Another layer 103 is then deposited on top of the previous layer from a material such as doped silica or dendrimer having slightly higher refractive index than the first layer 101. This layer 103 will form the core of the waveguide and the material for this layer can be either silica or polymeric; the only requirement is that its refractive index should be higher than the cladding layer. This layer's typical thickness can also be 5–6 µm, depending on the design. A typical value for refractive index contrast between the cladding and the core layer is of the order of 0.5–2%.

Figure 12:
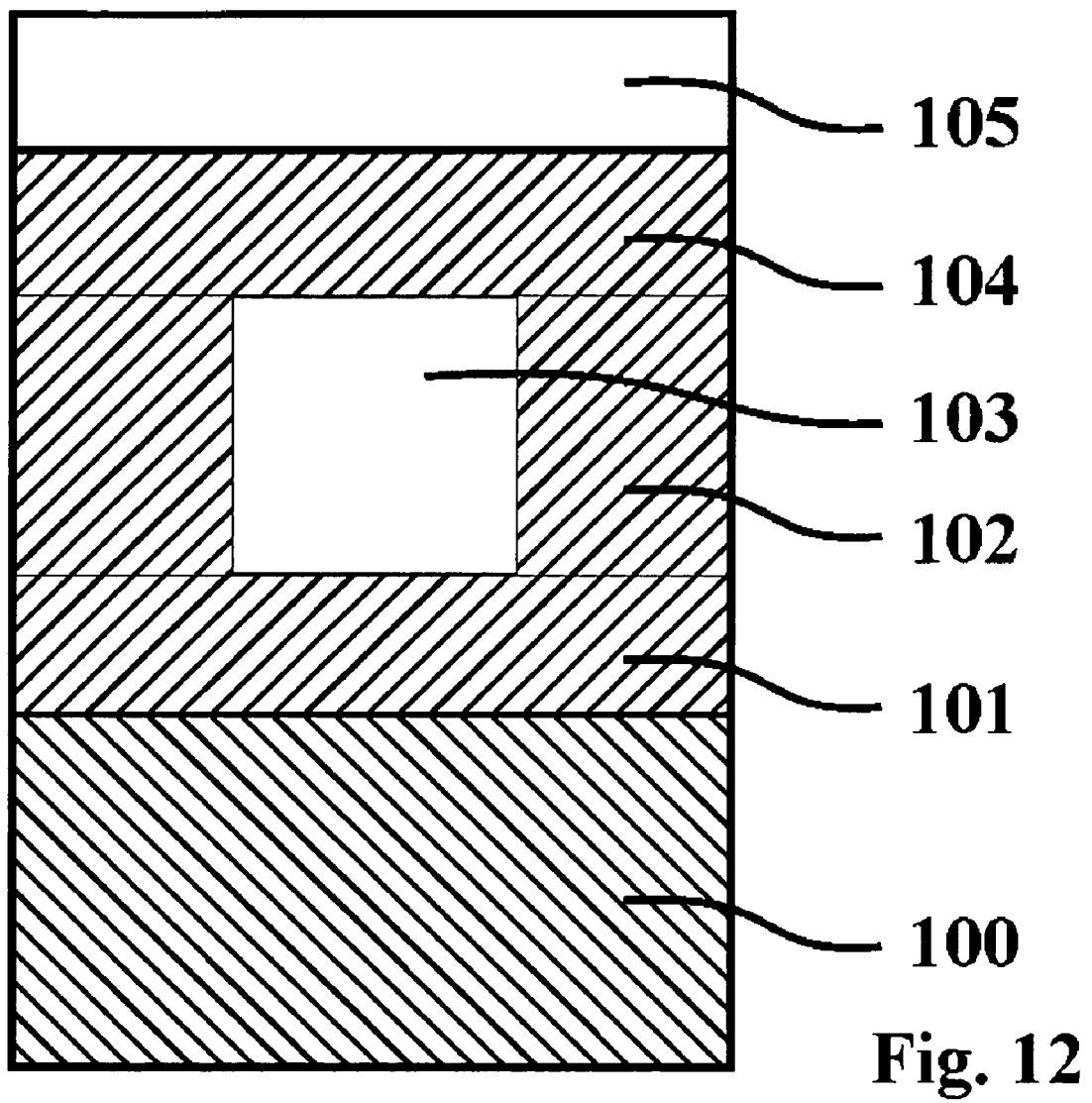
FIG. 12 shows the details of waveguide construction.

The layer 103 is then patterned by defining square ridges to form the core of the waveguide. The patterning can be done by an etching process such as reactive ion etching (RIE), or wet etching, or by e-beam lithography, depending on the material used to form the layer. The goal of etching is to form sharp walled ridges that form the waveguide core 103. Prior to etching, a mask is laid on the layer. For the RIE process, the mask allows the areas that will form the ridges to be protected while the exposed areas are removed. Only one core is shown in FIG. 12, however, plurality of cores can be formed from the same mask whose number depends on design and application; each core forms an independent waveguide after cladding layers are deposited. For instance, for an eight channel RAWG, as many as 35–50 waveguides may be necessary (depending on a given design). Core dimension also depends on a given design; typical dimension is 6×6 µm$^2$ as used in the example of FIG. 3. For this design 37 waveguides were constructed in the array 24 where the constant path difference between neighboring waveguides in the array is 150 µm.

After the etching process is completed, the entire surface is coated with another layer 102 from the same material and having identical refractive index as layer 101, to fill-in the intra-ridge spaces created by the removal of material during etching. This layer is further grown by depositing more of the same material by spin coating to form the cladding layer 104. The end result is the core 103 is completely covered by the cladding layers 101, 102 and 104. Finally a layer of film is deposited on the entire surface from a common material such as poly siloxane. This layer 105 serves as a cover layer to protect the waveguide structure, and its refractive index is not specified.

The slab 23 is also constructed by the same layer by layer approach described above. In practical fabrication process, the whole structure, i.e., the waveguides and the slab, all are constructed simultaneously from a single mask. The slab dimensions of the example in FIG. 3 is 3700 µm length (center 23a to center 23b of the arches), 1850 µm width, and a thickness of 6 µm. (See table 1 for other dimensions).

Figure 4:
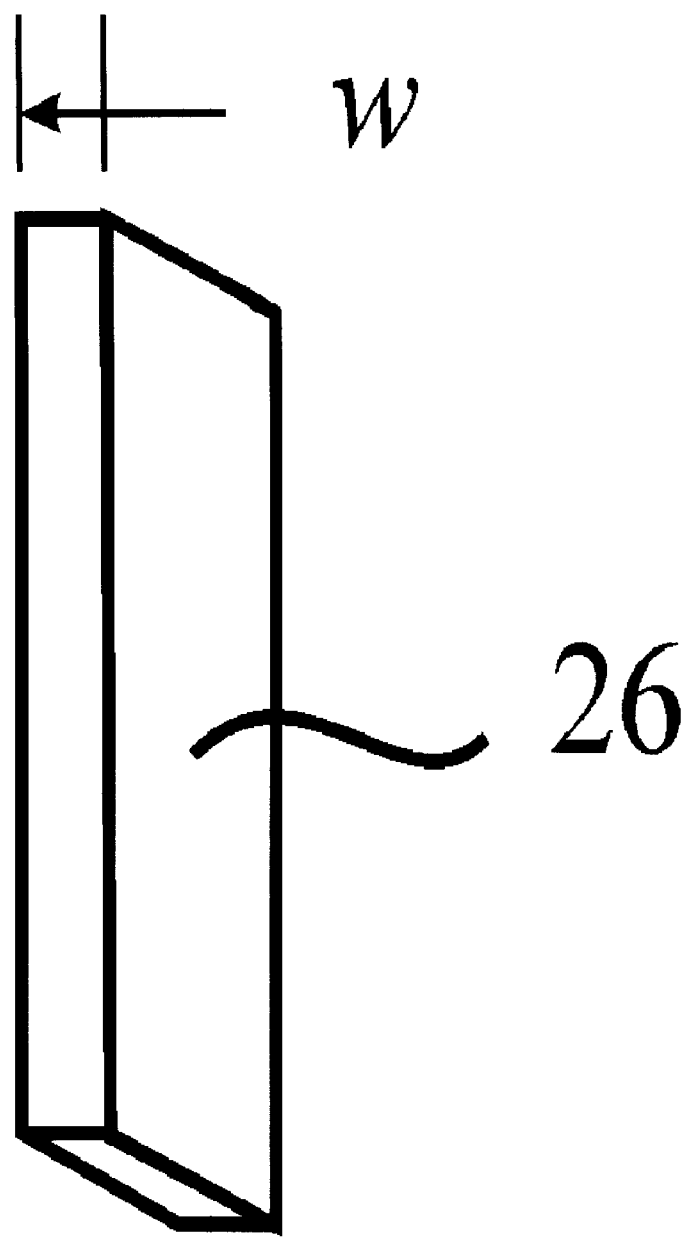
FIG. 4 is a sketch of the reflective mirror.

The mirror 26 has a length of 3735 µm and a thickness w of approximately 10 µm (see FIG. 4). The width of the mirror is the same as the thickness of the chip; it can be produced by evaporating a layer of gold or any other high reflectivity metal on the side of the chip with an appropriate mask. The mirror length will also depend on a given design, usually longer for higher channel device.

Triple-Phase Integration

While tiers of integration has been used in many electronic ICs such as in application specific ICs (ASICs) or multimodule ICs (MMICs), these integrations are mostly hybrid. That is separate ICs are packaged together to meet the need of specific applications. Some hybrid integration has also been attempted for PICs. However, the ability of a monolithic integration of multiple photonic functionalities on a single substrate has a great potential for system simplification, cost-effectiveness, and performance enhancement. Such a scale of integration can be achieved by integrating the PIC described herein over three main tiers, a scheme termed as "triple-phase integration."

At the first phase of integration in the passive domain, the PIC can be used to design a number of photonic devices such as multi-channel tunable optical add/drop multiplexer, multi-channel variable optical attenuator, multi-channel optical channel monitor, multi-channel tunable optical gain equalizer, multi-channel thermo-optic switch, interleavers, etc.

At the second phase of integration, these chips can be combined with appropriate on-chip gain medium (e.g., $Er^{3+}$ doped waveguide) to produce the above mentioned PICs with extremely low-loss and/or with a gain. This is important, because, current optical transmission systems require frequent signal amplification and regeneration (also called repeater) which is expensive. Ability to build systems with extremely low-loss and/or gain will simplify system design significantly. It will also eliminate the frequent need of repeaters, thus enabling significant cost reduction and ease of deployment.

The third phase of integration will allow combining these low-loss PICs with active elements such as laser-diodes or VCSELS, detector arrays, and electro-optic modulators to produce a line of optronic modules and systems. Examples include, multi-channel modulators, receivers, transmitters, transceivers and transponders, and fully built out DWDM systems.

Example of Triple-Phase Integration

Some examples of first-phase, second-phase and third-phase integration are included. The RAWG itself (e.g., FIG. 3) is an example of first-phase integration of waveguide elements such as ridge and slab waveguides. Other examples of first-phase integration include optical power splitter, interleaver, and combination of interleaver and RAWG based PICs.

Figure 13:
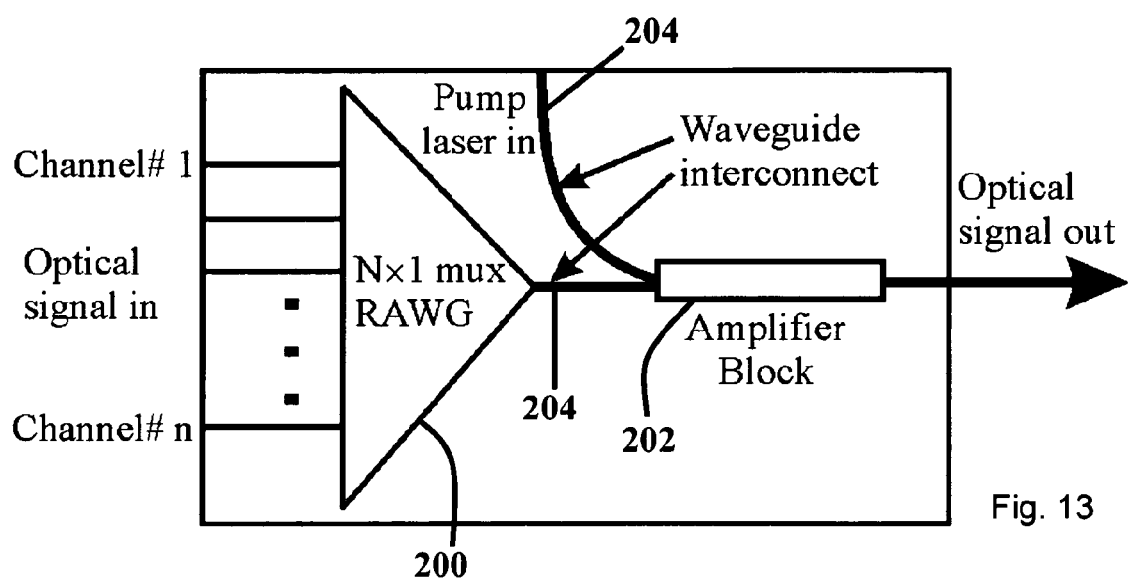
FIG. 13 is an example of a second-phase integration of a PIC with an amplifier block constructed monolithically on a substrate. The PIC is connected to the amplifier via waveguide interconnect.

FIG. 13 shows an example of a second-phase chip-scale integration of a PIC (specifically a RAWG) with an amplifier block constructed monolithically on a substrate. Here a passive device (the RAWG) is integrated with an active unit (the amplifier) 202 by monolithic way (i.e., fabricated on the same substrate). The PIC 200 is connected to the amplifier 202 via waveguide interconnect 204. The RAWG 200, the amplifier block 02, and the waveguide interconnects 204, all fabricated by a layer by layer approach as described in connection with FIG. 12. Optical amplifiers are pumped by an external laser to produce amplification. That is, the amplifying material such as Erbium doped dendrimer or glass absorbs light in the 890 nm and 1480 nm regions, and emits light in the 1310 nm and 1550 nm regions. This additional emission in the 1550 nm region (or in the 1310 nm regions) strengthens the input signal by increasing its intensity. Usually a WDM coupler is used to combine the pump laser and optical signal at the input of the amplifier and another WDM coupler is used to separate the pump from amplified signal at the output. In the scheme shown in FIG. 13, the chip can be used as a self-contained unit via the second-phase integration where no external WDM coupler is necessary. The waveguide interconnect 204 can be used for coupling the pump laser and input signal into the amplifier block 202. Also by using the spectrograph properties of the RAWG 200, this scheme can eliminate the need of a WDM coupler at the output end as well. Thus the second-phase integration is advantageous because it can eliminate attaching external WDM couplers and thus can enable a true chip-scale PIC; the assembly is termed as an amplified PIC (APIC).

Figure 14:
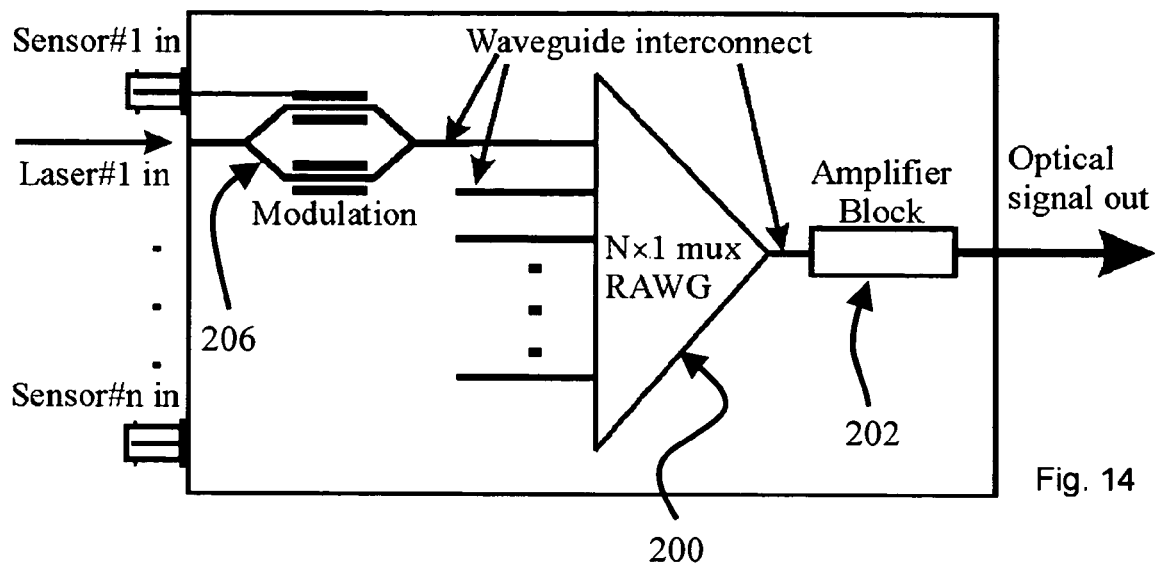
FIG. 14 is an example of a third-phase integration of a PIC with a modulator block and amplifier block constructed monolithically on a substrate. All components are interconnected via on-chip waveguide interconnects.
Figure 14A:
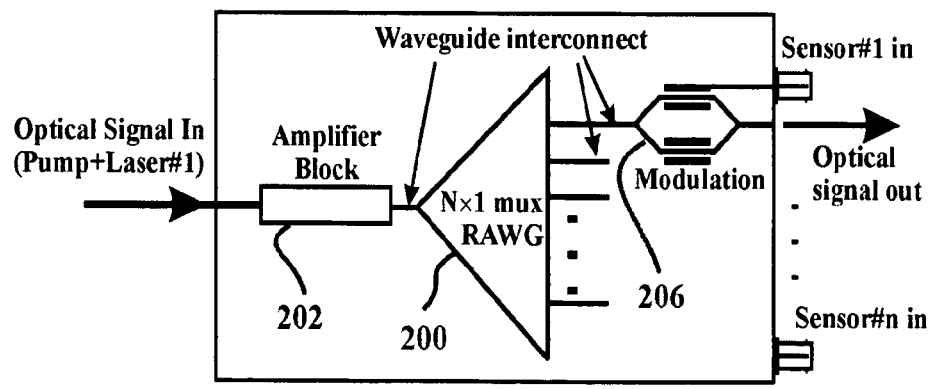
FIG. 14A is another embodiment of the third-phase integration of the PIC shown in FIG. 14.

FIG. 14 is an example of a third-phase chip-scale integration of a PIC with a modulator and amplifier block constructed monolithically on a substrate. Here three different components are integrated: a RAWG (passive unit), an amplifier (active unit), and a modulator (a signal processing unit) 206. All components are interconnected via on-chip waveguide. 204, 208. The RAWG 200, the modulator block 206, and the amplifier block 202, all can be fabricated from a single mask via a layer by layer approach as described in connection with FIG. 12; the assembly is termed as an amplified electronic PIC (AEPIC). In addition, active elements such as laser diodes, VCSELs, and detectors can also be fabricated on the same substrate using separate masks and material. Such an assembly, if constructed without an amplifier block, may be termed as an electronic PIC (EPIC). Many active elements such as laser diodes and modulators require metallization for electrodes attachment; this can be done using a separate mask via metal evaporation or sputtering process.

Although a particular embodiment of the invention has been described in detail for purposes of illustration, various modifications and enhancements may be made without departing from the spirit and scope of the invention. Accordingly, the invention is not to be limited except as the appended claims.

The invention claimed is:

1. A second-phase photonic integrated circuit comprising a photonic integrated circuit, the photonic integrated circuit comprising:

An input/output interface arranged on a substrate comprising a plurality of waveguides for simultaneously inputting at least one signal to an outputting at least one signal from the photonic integrated circuit for demultiplexing a multiplexed optical signal in to n different constituent wavelengths and for combining n input optical signals composed of n different constituent wavelengths in to a multiplexed signal;

a slab waveguide arranged on the substrate having a first end and a second end, the first end coupled to the plurality of waveguides of the input/output interface to focus the at least one input signal to the second end, and the second end coupled to an array waveguide, for focusing the at least one output signal to the input/output interface through the first end;

the array waveguide arranged on the substrate comprising a plurality of waveguides for coupling the one or more input signals, separating the one or more input signals into the n different constituent wavelengths and focusing the n different constituent wavelengths back on to the slab waveguide first end coupling to the input/output interface, the plurality of waveguides of the array waveguide being optically coupled at one end with the second end of the slab waveguide, and terminating at an opposing end of the array waveguide by a reflective mirror, each waveguide of said array waveguide having a predetermined path difference between successive waveguides; and the reflective mirror integrally disposed and formed along an edge of the integrated circuit at the opposing end of the array waveguide for reflecting the one or more signals incident on it from the array waveguide back into the array waveguide;

and an active unit formed on the substrate, the active unit connected to the photonic integrated circuit by a waveguide interconnect means, where the amplifier block is comprised of a material that absorbs light in the 890 nanometer and the 1480 nanometer regions and emits light in the 1310 nanometer and 1550 nanometer regions.

2. The second-phase photonic integrated circuit as set forth in claim 1, wherein the amplifier block material is selected from one of the following: erbium doped dendrimer or glass.

3. A second-phase photonic integrated circuit comprising:

a photonic integrated circuit, the photonic integrated circuit comprising:

An input/output interface arranged on a substrate comprising a plurality of waveguides for simultaneously inputting at least one signal to and outputting at least one signal from the photonic integrated circuit for demultiplexing a multiplexed optical signal in to n different constituent wavelengths and for combining n input optical signals composed of n different constituent wavelengths in to a multiplexed signal;

a slab waveguide arranged on the substrate having a first end and a second end, the first end coupled to the plurality of waveguides of the input/output interface to focus the at least one input signal to the second end, and the second end coupled to an array waveguide, for focusing the at least one output signal to the input/output interface through the first end;

the array waveguide arranged on the substrate comprising a plurality of waveguides for coupling the one or more input signals, separating the one or more input signals into the n different constituent wavelengths and focusing the n different constituent wavelengths back on to the slab waveguide first end coupling to the input/output interface, the plurality of waveguides of the array waveguide being optically coupled at one end with the second end of the slab waveguide, and terminating at an opposing end of the array waveguide by a reflective mirror, each waveguide of said array waveguide having a predetermined path difference between successive waveguides; and the reflective mirror integrally disposed and formed along an edge of the integrated circuit at the opposing end of the array waveguide for reflecting the one or more signals incident on it from the array waveguide back into the array waveguide;

and an active unit formed on the substrate, the active unit connected to the photonic integrated circuit by a waveguide interconnect means, a signal processing unit coupled to the photonic integrated circuit for electro-optically processing the input and output signals, wherein the signal processing unit is a modulator block; wherein the modulator block is connected to the photonic integrated circuit through a first waveguide interconnect, and the photonic integrated circuit is connected to the active unit through a second waveguide interconnect.

* * * * *